United States Patent [19]
Pols

[11] Patent Number: 5,924,762
[45] Date of Patent: Jul. 20, 1999

[54] TRUCK TUNNEL

[76] Inventor: Robert E Pols, P.O. Box 5689, Bay Shore, N.Y. 11706

[21] Appl. No.: 08/851,582

[22] Filed: May 5, 1997

[51] Int. Cl.$^6$ ..................................................... B60P 3/373
[52] U.S. Cl. ........................................... 296/166; 49/477.1
[58] Field of Search ..................................... 296/166, 164, 296/156; 49/495.1, 477.1

[56] References Cited

U.S. PATENT DOCUMENTS

| | | | |
|---|---|---|---|
| 3,837,700 | 9/1974 | Van Slyke | 296/166 |
| 3,897,970 | 8/1975 | Gattenby . | |
| 4,095,836 | 6/1978 | Pettit . | |
| 4,299,422 | 11/1981 | Pettit . | |
| 4,616,871 | 10/1986 | Pettit . | |
| 5,077,945 | 1/1992 | Koeniger | 52/169.14 |

*Primary Examiner*—D. Glenn Dayoan
*Assistant Examiner*—Jason Morrow
*Attorney, Agent, or Firm*—Michael I. Kroll

[57] ABSTRACT

A truck tunnel (12) for a pickup truck (14) having a cab (16) with a rear window (18) in a rear wall (20) and a camper cap (22) on a bed (24) of the pickup truck (14) with a front window (26) in a front wall (28), spaced by a predetermined gap (30) from the rear wall (20) of the cab (16). The truck tunnel (12) comprises an inflatable apertured structural component (32) that is insertable into the predetermined gap (30) between the rear wall (20) of the cab (16) and the front wall (28) of the camper cap (22) and can be manipulated to extend about the rear window (18) in the rear wall (20) of the cab (16) and the front window (26) in the front wall (28) of the camper cap (22) to form a weatherproof and windproof seal therebetween. The rear window (18) and the front window (26) can be left opened to allow heated and cool air to go from the cab (16) into the camper cap (22), while greatly improving rear visibility for the driver (34) of the pickup truck (14) when looking in a rear view mirror (36) in the cab (16) through the opened rear window (18) and front window (26).

1 Claim, 7 Drawing Sheets

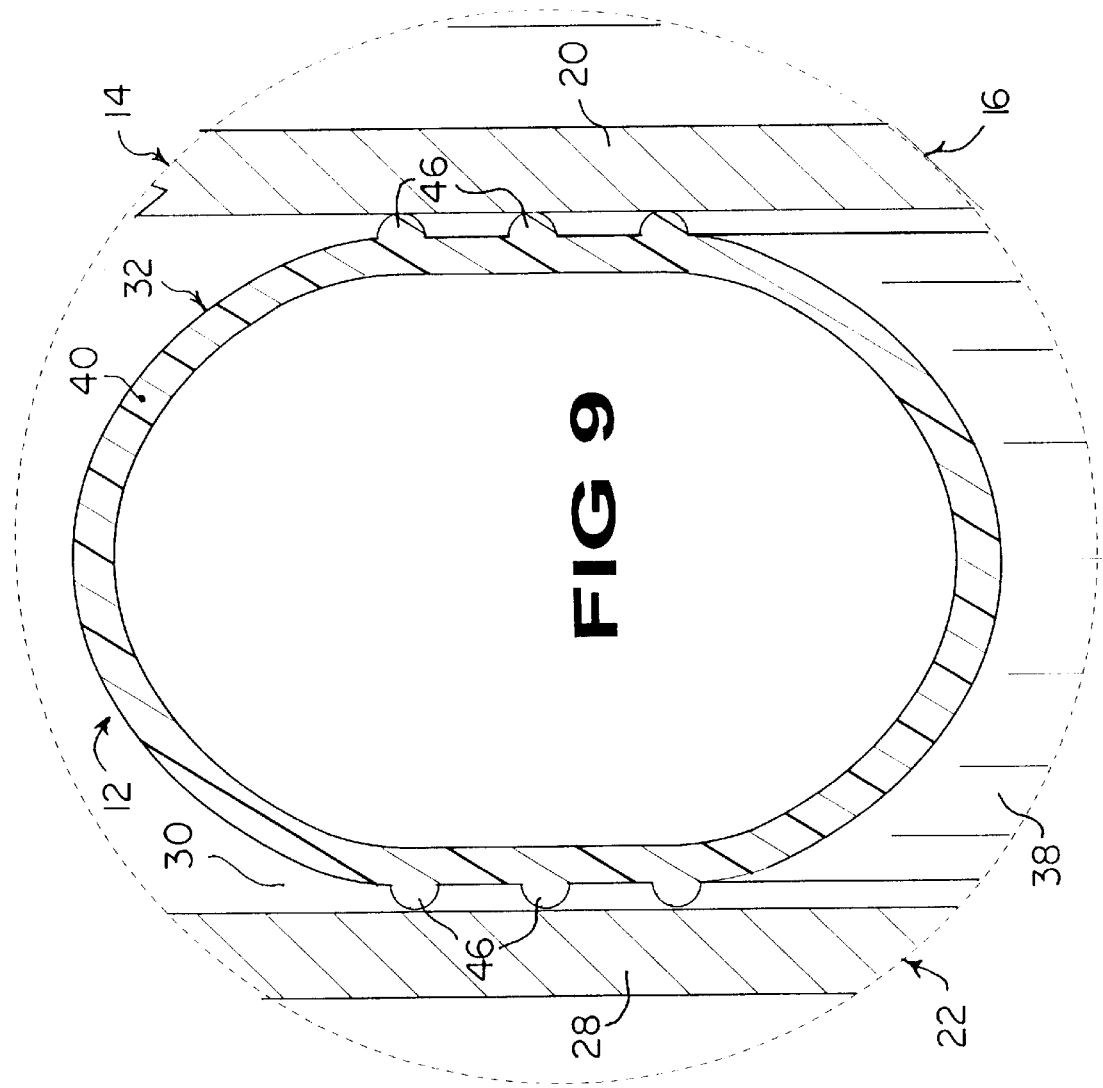
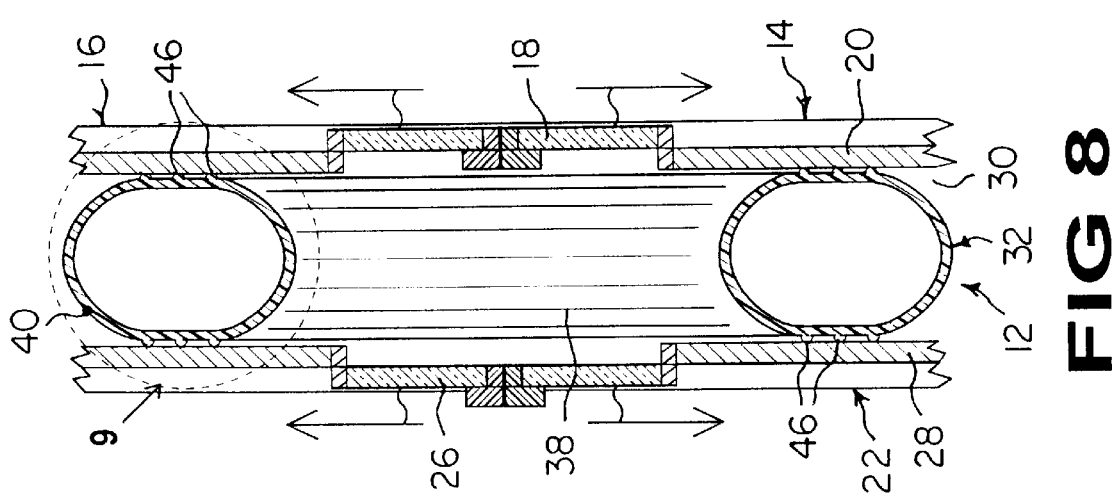

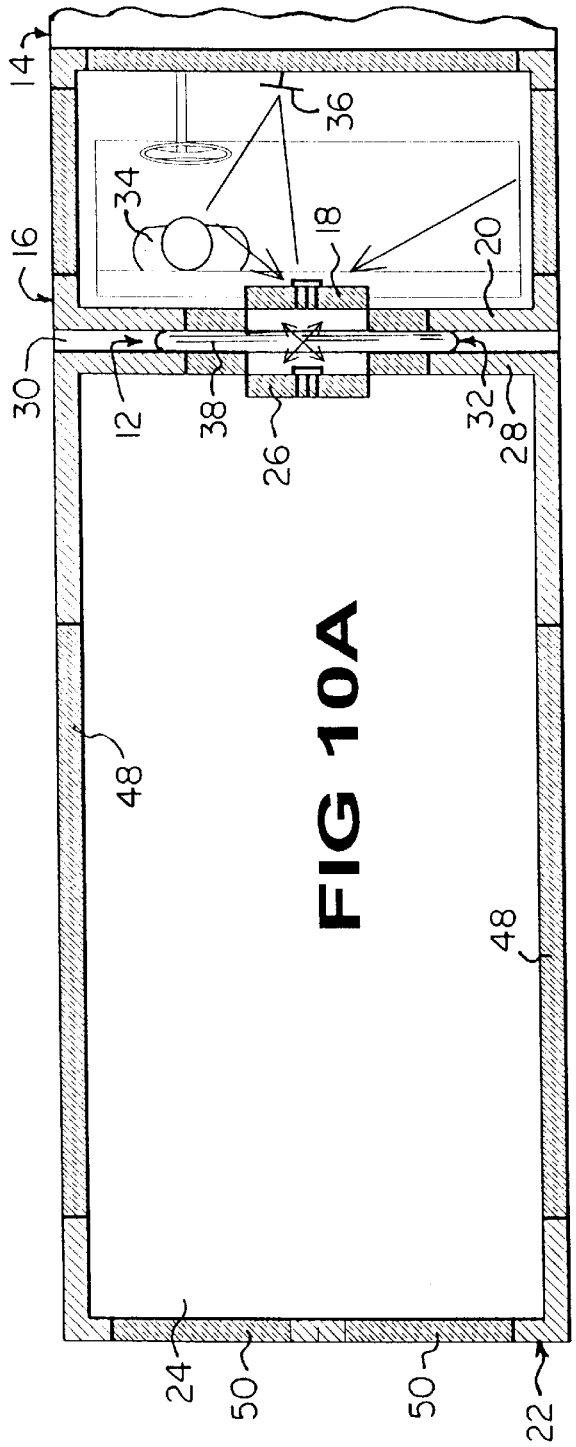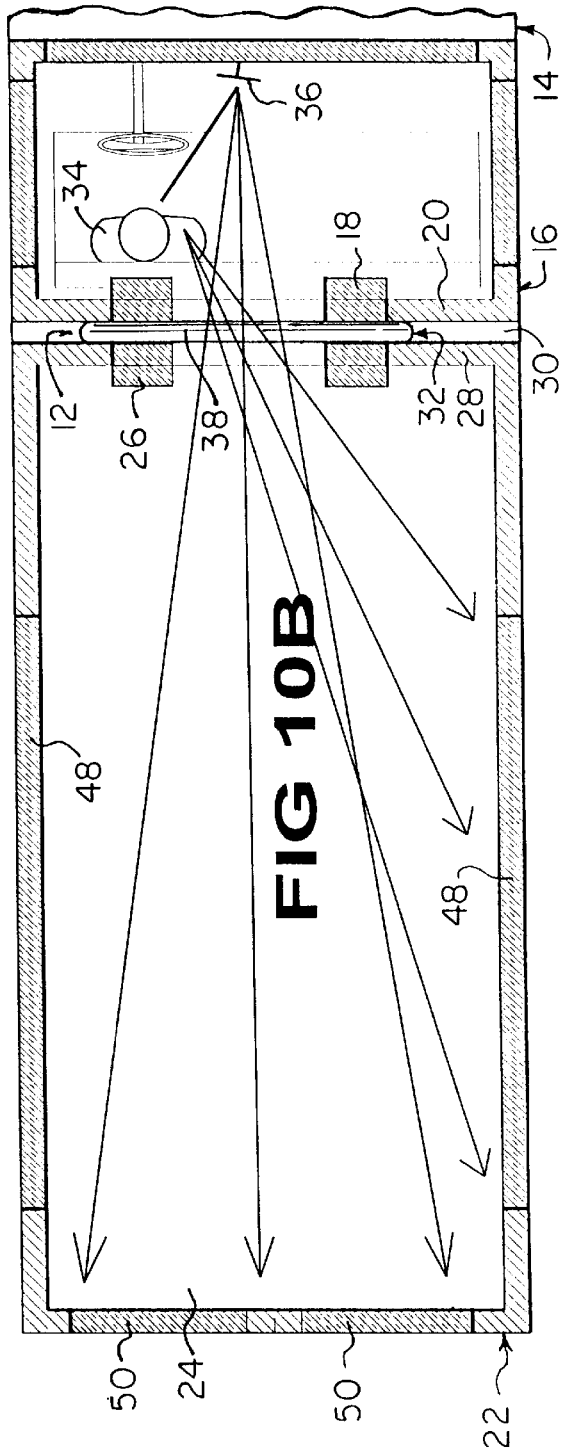

TRUCK TUNNEL

BACKGROUND OF THE INVENTION

1. Field of the Invention

The instant invention relates generally to passageway structure seals and more specifically it relates to a truck tunnel. The truck tunnel is an inflatable circular tube for securement between a rear wall of a pickup truck cab and a front wall of a camper cap to form a weatherproof and windproof seal therebetween.

2. Description of the Prior Art

Numerous passageway structure seals have been provided in prior art. For example, U.S. Pat. Nos. 3,897,970 to Gattenby; 4,095,836 to Pettit; 4,299,422 to Pettit and 4,616,871 to Pettit all are illustrative of such prior art. While these units may be suitable for the particular purpose to which they address, they would not be as suitable for the purposes of the present invention as heretofore described.

A flexible, resilient, soft material inflatable filler is tapered and flat-sided with corner beading to firmly and frictionally lodge between cab wall and cap wall while extending around the cab window and camper cap window to enable vision therethrough while preventing accumulation of snow or leaves in the gap. The filler is of inverted U-shape, and generally quadrangular in cross section, and entirely fills the gap. It is self-supporting when inflated for easy insertion in, and withdrawal from the gap, held in place by full inflation to the desired pressure, but foldable into a compact package when deflated, the seal extends fully across the gap from one side of the cab and cap to the other side thereof.

To provide needed stability between a vehicle, such as a pickup truck, and an added removable body component, such as a camper, one or more large inflatable structural components are positioned fully between them at the cab location. For example, wherein a large camper is placed on a pickup truck and the camper has a cab-over portion generally housing a sleeping space, two inflatable structural components are utilized. One structural component is located fully on the cab roof and inflated into mutual contact with the cab-over portion of the camper that is directly opposite the full cab roof. The other structural component is located between the full rear of the cab, minus any window area, and the front wall of the camper, minus any window area, and is inflated into mutual contact with their respective surfaces. Each structural component functions to withstand and to modify the possible changing relative motions between the vehicle and body component so they become more of an overall single-like structural unit increasing the overall stability of their combination.

A flexible, plastics material boot for insertion within the adjacent opened windows in a camper, cap or canopy and truck combination. A central flexible tunnel has two inflatable toroidal chambers at the tunnel ends which are simply pushed or popped into place after chamber inflation. No other attachment of any kind is required to install the boot in place.

A plastics material boot for insertion within adjacent, aligned openings or windows in a camper, cap or canopy and truck combination. A central, flexible tunnel in the form of an inflatable toroidal chamber has spring loaded, compressible, generally quadrilaterally shaped ends inserted through and behind the openings in a compressed state where after they are released to expand and retain the ends behind the openings. The central tunnel is then inflated. No other attachment of any kind is needed to install and retain the boot in place.

SUMMARY OF THE INVENTION

A primary object of the present invention is to provide a truck tunnel that will overcome the shortcomings of the prior art devices.

Another object is to provide a truck tunnel that is an inflatable circular tube that can be secured within a gap between a rear wall of a cab of a pickup truck and a front wall of a camper cap, so that the tube can be manipulated to fit about a rear window of the cab and a front window of the camper cap to form a weatherproof and windproof seal therebetween.

An additional object is to provide a truck tunnel that will greatly improve rear visibility for the driver of the pickup truck, since the rear window of the cab and the front window of the camper cap can be left opened to allow heated or cool air to go from the cab into the camper cap.

A further object is to provide a truck tunnel that is simple and easy to use.

A still further object is to provide a truck tunnel that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 8 is a cross sectional view taken along line 8—8 in FIG. 6, showing the instant invention installed within the gap about a front window in the camper cap and a rear window in the cab of the pickup truck.

FIG. 9 is an enlarged cross sectional view of an area indicated by arrow 9 in FIG. 8.

FIG. 10A is a diagrammatic cross sectional view taken along line 10A—10A in FIG. 6, showing the front window in the camper cap and the rear window in the cab of the pickup truck closed.

FIG. 10B is a diagrammatic cross sectional view taken along line 10B—10B in FIG. 6, showing the front window in the camper cap and the rear window in the cab of the pickup truck opened.

Similar reference characters denote corresponding features consistently throughout the attached drawings.

DETAILED DESCRIPTION OF THE PREFERRED EMBODIMENTS

Figure 1:
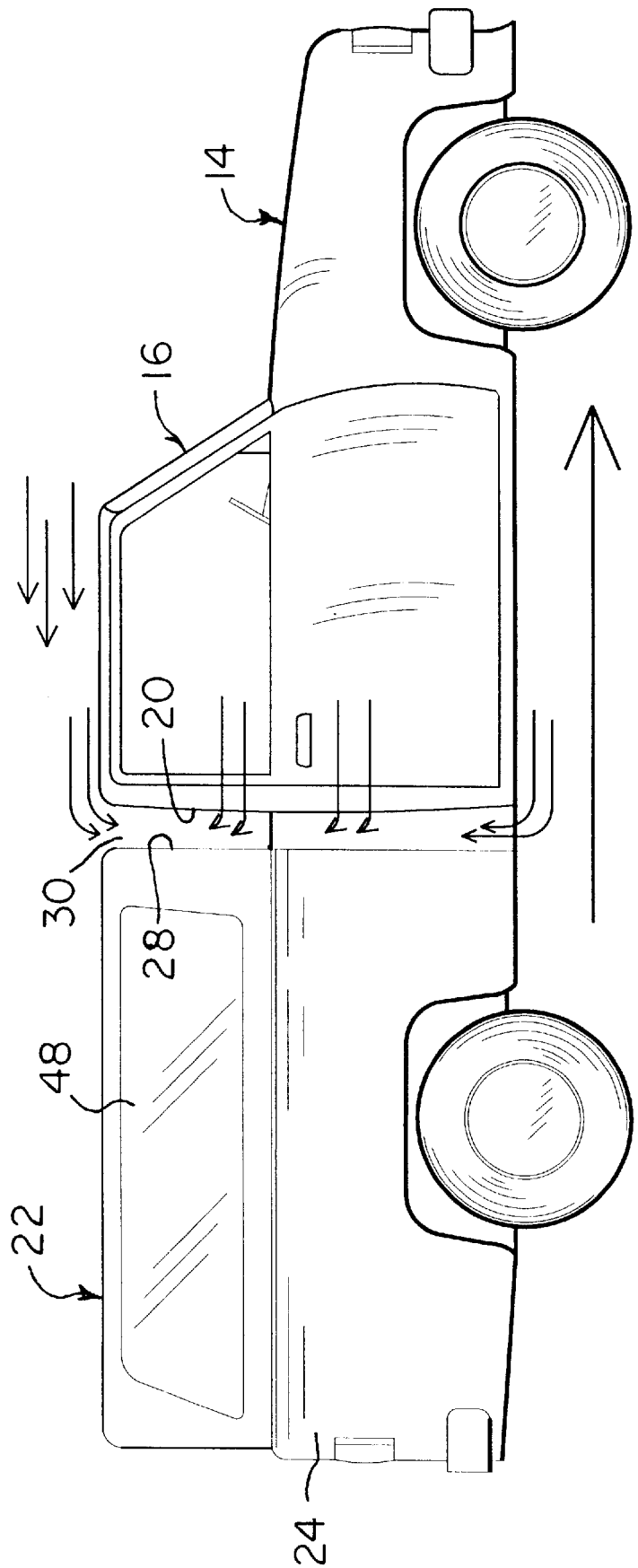
FIG. 1 is a side elevational view of a pickup truck with a camper cap upon its bed, showing a gap between a cab of the pickup truck and the camper cap.
Figure 3:
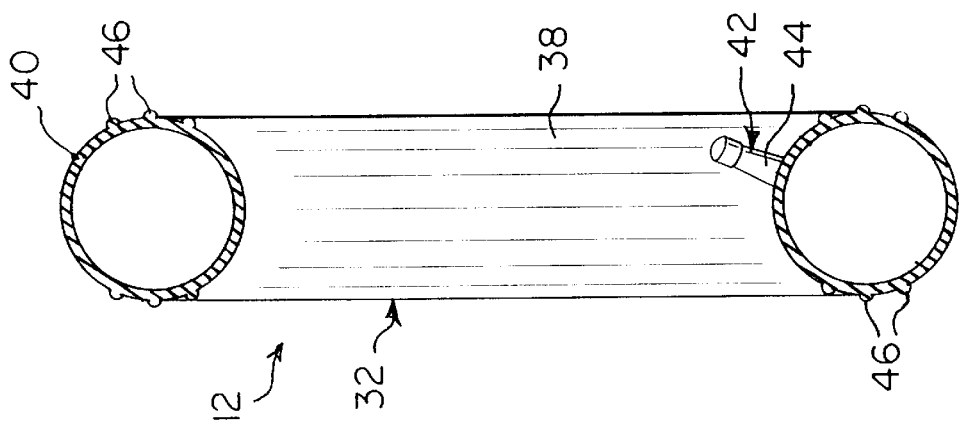
FIG. 3 is a cross sectional view taken along line 3—3 in FIG. 2.

Turning now descriptively to the drawings, in which similar reference characters denote similar elements throughout the several views, FIGS. 2 to 10B illustrates a truck tunnel 12. With regard to the reference numerals used, the following numbering is used throughout the various drawing figures.

12 truck tunnel
14 pickup truck
16 cab on 14
18 rear window in 20
20 rear wall of 16
22 camper cap on 24
24 bed of 14
26 front window in 28
28 front wall of 22
30 predetermined gap
32 inflatable apertured structural component of 12
34 driver of 14
36 rear view mirror in 16
38 cylindrical tube for 32
40 relatively flexible, soft, resilient air impervious material for 32
42 inflating structure of 12
44 air valve for 42 in 32
46 annular rib on 38
48 side window of 22
50 rear window of 22

FIG. 1 shows a pickup truck 14 having a cab 16 with a rear window 18 in a rear wall 20 and a camper cap 22 on a bed 24 of the pickup truck 14 with a front window 26 in a front wall 28, spaced by a predetermined gap 30 from the rear wall 20 of the cab 16.

The truck tunnel 12 in FIGS. 2 to 10B, comprises an inflatable apertured structural component 32 that is insertable into the predetermined gap 30 between the rear wall 20 of the cab 16 and the front wall 28 of the camper cap 22 and can be manipulated to extend about the rear window 18 in the rear wall 20 of the cab 16 and the front window 26 in the front wall 28 of the camper cap 22, to form a weatherproof and windproof seal therebetween. The rear window 18 and the front window 26 can be left opened to allow heated and cool air to go from the cab 16 into the camper cap 22, while greatly improving rear visibility for the driver 34 of the pickup truck 14, when looking in a rear view mirror 36 in the cab 16 through the opened rear window 18 and front window 26.

The inflatable apertured structural component 32 is a cylindrical tube 38. The inflatable apertured structural component 32 is fabricated out of a relatively flexible, soft, resilient air impervious material 40.

The truck tunnel 12 further contains a structure 42 for inflating the inflatable apertured structural component 32 with air. The inflating structure 42 is an air valve 44 connected to the inflatable apertured structural component 32.

The truck tunnel 12 shown in FIGS. 2, 3, 8 and 9, can further include a plurality of annular ribs 46 integral with and extending about opposite sides of the cylindrical tube 38, to form a better grip and weather tight seal within the gap 30 between the rear wall 20 in the cab 16 of the pickup truck 14 and the front wall 28 in the camper cap 22. The circumference of the cylindrical tube 38 is approximately the same size as the circumference of the open rear window 18 in the rear wall 20 of the cab 16 and the open front window 26 in the front wall 28 of the camper cap 22, so that the cylindrical tube 38 can be adjusted to fit thereabout.

The cylindrical tube 38 is normally circular. When the cylindrical tube 38 is inserted within the gap 30 between the rear wall 20 in the cab 16 of the pickup truck 14 and the front wall 28 in the camper cap 22 and fully inflated, the cross sectional area of the cylindrical tube 38 will become oval to make a tighter weatherproof and windproof seal therebetween.

Figure 2:
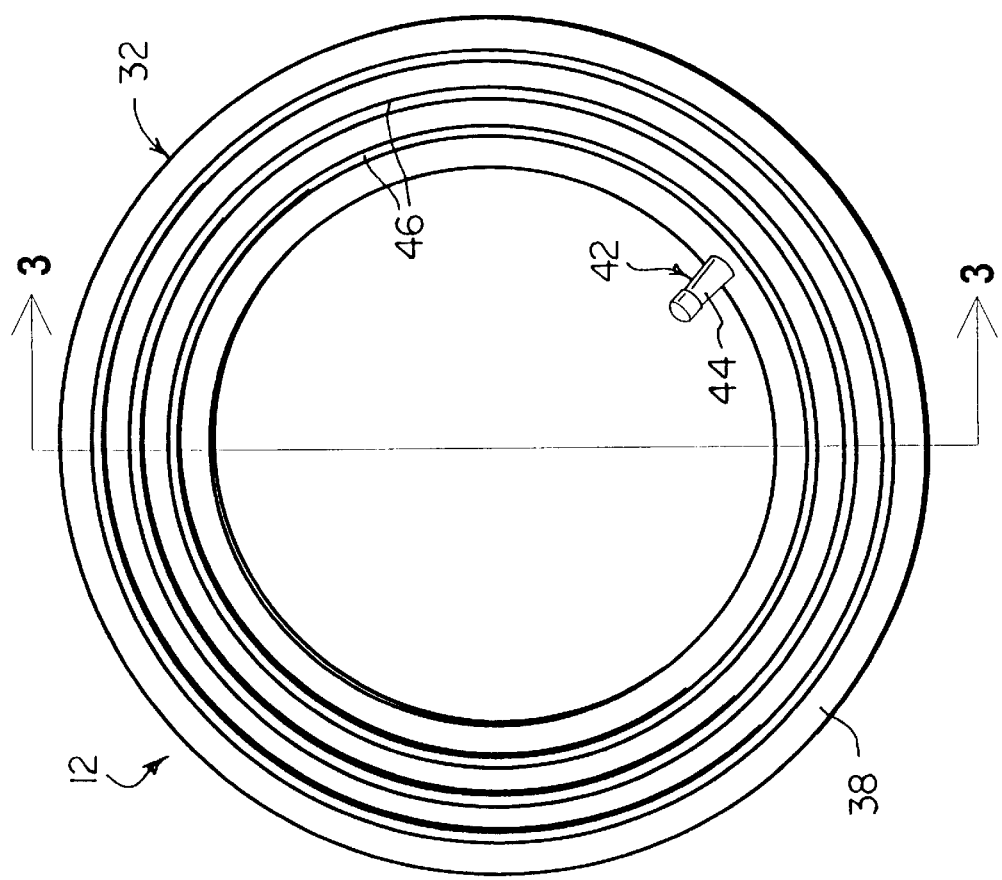
FIG. 2 is a plan view of the instant invention having annular ribs thereon.
Figure 5:
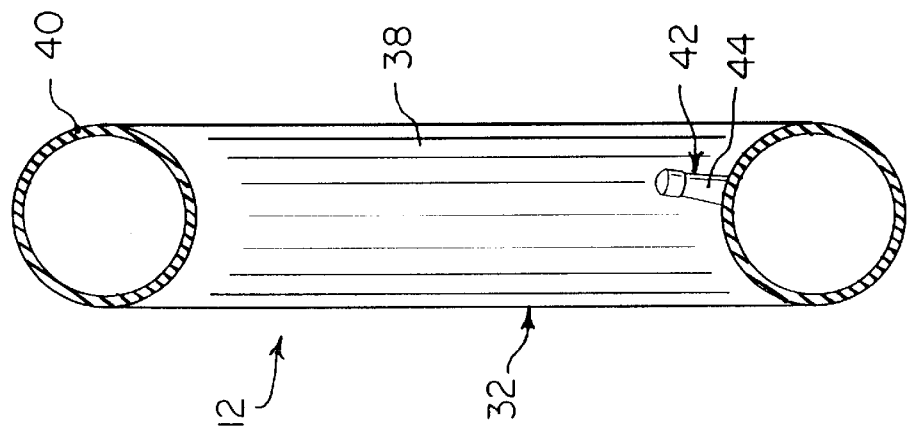
FIG. 5 is a cross sectional view taken along line 5—5 in FIG. 4.
Figure 4:
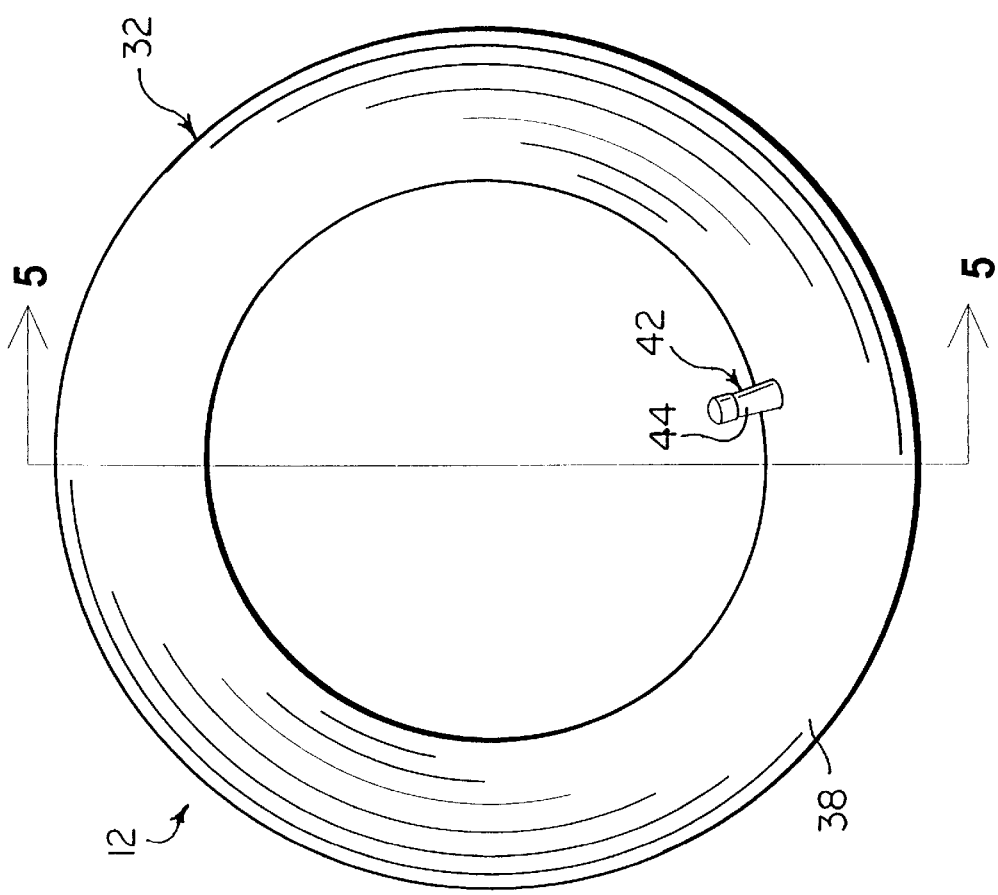
FIG. 4 is a plan view of the instant invention similar to FIG. 2, without the annular ribs thereon.
Figure 6:
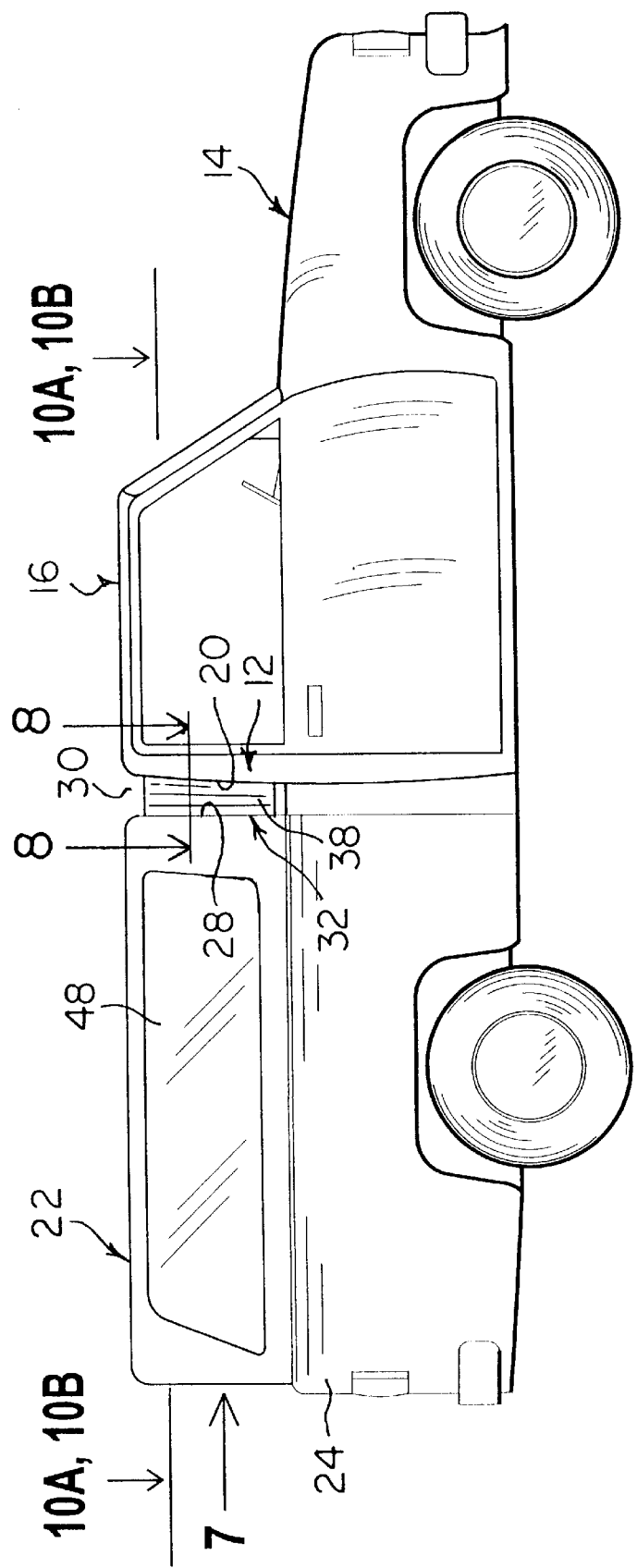
FIG. 6 is a side elevational view similar to FIG. 1, showing the instant invention installed within the gap.
Figure 7:
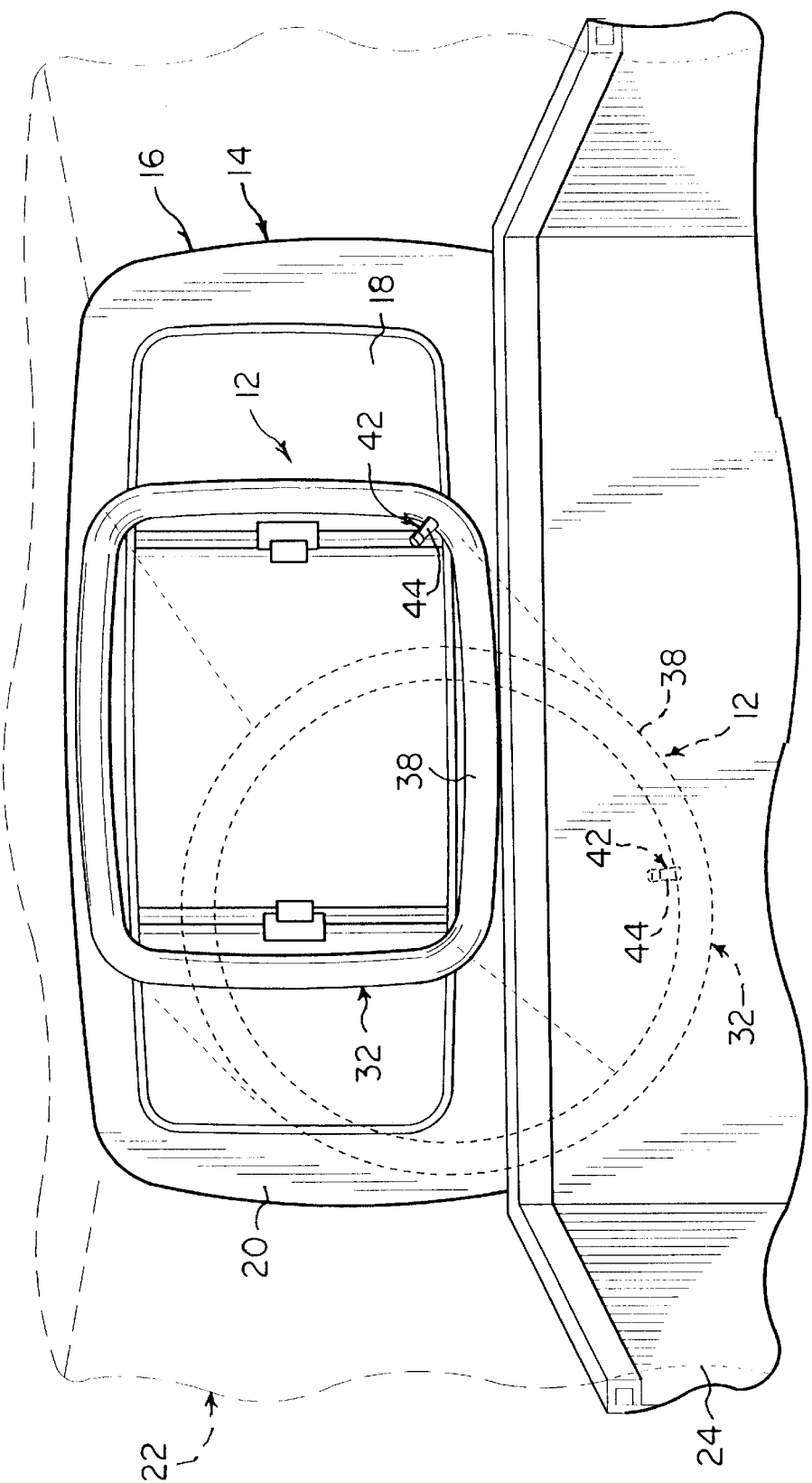
FIG. 7 is a rear perspective view taken in the direction of arrow 7 in FIG. 6, with parts broken away and the camper cap in phantom, showing how the instant invention can be installed within the gap.

The relatively flexible, soft, resilient air impervious material 40 in FIGS. 2 and 5, is shown as rubber. The relatively flexible, soft, resilient air impervious material 40 in FIGS. 8 and 9, is shown as plastic. The camper 22 has side windows 48 and rear windows 50. The rear window 18 in the rear wall 20 of the cab 16 and the front window 26 in the front wall 28 of the camper cap 22 are in alignment and can both slide open. This allows the driver 34 of the pickup truck 14 to look into the rear view mirror 36 past the open rear window 18 and the open front window 26 and out through the rear windows 50 in the camper cap, without any interference or glare. The driver 34 can also turn to look out of one of the side windows 48, as illustrated in FIG. 10B.

OPERATION OF THE INVENTION

To use the truck tunnel 12, the following steps should be taken:

1. Open the rear window 18 in the rear wall 20 of the cab 16 on the pickup truck 14.

2. Open the front window 26 in the front wall 28 of the camper cap 22.

3. Partly inflate the cylindrical tube 38 through the air valve 44 with an air pump.

4. Insert the partly inflated cylindrical tube 38 into the predetermined gap 30.

5. Manipulate the partly inflated cylindrical tube 38, so that it extends about the opened rear window 18 and the opened front window 26.

6. Fully inflate the cylindrical tube 38 through the air valve 44 with the air pump, so that the cylindrical tube 38 is securely locked into place to prevent debris, air, wind, noise and water from entering the gap 30, the opened rear window 18 and the opened front window 26.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A truck tunnel for and in combination with a pickup truck having a cab with a rear window in a rear wall and a camper cap on a bed of the pickup truck with a front window in a front wall, spaced by a predetermined gap from the rear wall of the cab, said truck tunnel comprising:

an inflatable cylindrical, annular tube in the form of a torus filling said gap between the rear wall of the cab and the front wall of the camper cap and extending about and enclosing the rear window in the rear wall of the cab and the front window in the front wall of the camper cap to provide weatherproof and windproof communication between said windows, a front side of said tube in contact with the rear wall of said cab and a rear side of said tube in contact with the front wall of the camper cap, so that the rear window and the front window can be left opened to allow heated and cool air to go from the cab into the camper cap, while providing rear visibility for the driver of the pickup truck when looking in a rear view mirror in the cab through the opened rear window and front window;

said annular tube having means including an air valve to inflate said tube, said air valve extending inwardly toward the center of said torus; and said annular tube having means to provide sealing between said tube and said front and rear walls comprising three spaced protruding annular rounded ribs on each of said front and rear sides of said tube extending completely around said torus for gripping said front and rear walls over the full length of said tube when said tube is in place and inflated.

\* \* \* \* \*